United States Patent Office.

GEORGE JAQUES, OF BOSTON, MASSACHUSETTS.

Letters Patent No. 107,689, dated September 27, 1870.

IMPROVEMENT IN METHODS OF PRESERVING FRUIT.

The Schedule referred to in these Letters Patent and making part of the same.

*To all whom it may concern:*

Be it known that I, GEORGE JAQUES, of Boston, in the county of Suffolk and Commonwealth of Massachusetts, have invented a new and improved Process of Preserving Fruits from Decay; and I do hereby declare that the following is a full and exact description thereof.

My invention is founded upon the recent discovery in vegetable physiology, that the rotting of fruits is produced by fungoid vegetation, and that if the spores of such fungi can be prevented from germinating or growing, the fruit can be preserved from decay for an indefinite period.

I have discovered that sulphur, in its pure or uncombined form, possesses the property of preventing the growth of fungoid vegetation and arresting fermentation, and I believe myself to be the first discoverer of this property of sulphur.

My invention consists in the application of this discovery for the purpose of preserving fruit, by preventing the growth of fungoid vegetation and arresting fermentation and decay, by means of methods the same, or substantially the same, as those hereinafter set forth, or by any other equivalent methods, which embody the practical application of the discovery I have made.

My method consists in either packing the fruit which it is desired to preserve in layers of pulverized sulphur; or in rolling the fruit in such powder, and then packing it in paper; or in putting the flowers of sulphur or pulverized sulphur into papers in which the fruit is enveloped; or in sulphurizing the interior of boxes, casks, or other packages in which the fruit is to be kept or transported, either by smearing their interior with pulverized sulphur or flowers of sulphur; or by painting the interior of such boxes, casks, or packages, with sulphur in a melted state, or by condensing the vapor of sulphur on the interior of such casks, boxes, or packages.

The sulphur alone, applied in any of the modes above described, will be found efficient for preserving the fruit from decay; but I find it more advantageous to mix the flowers of sulphur with charcoal produced from cork, or the charcoal produced from any light porous wood or other vegetable matters, such as peat, the charcoal acting as an antiseptic, preventing putrefaction and fermentation, and absorbing with great avidity all gaseous emanations and moisture, and thus co-operating with the sulphur in keeping the fruit clear from matter that would engender fermentation and promote the growth of parasitic funguses.

Although I may use sulphur alone in any of the modes above specified, or sulphur mixed with any form of charcoal, the process which I prefer is, packing the fruit, in either of the modes mentioned above, with pulverized sulphur, mixed with pulverized charcoal produced from cork.

This process of preserving fruit is specially applicable to oranges, limes, lemons, and other perishable fruits; and it may also be applied to the preservation of grapes, apples, pears, plums, and even to potatoes, turnips, and other vegetables. The pulverized sulphur, the sulphur mixed with pulverized cork, charcoal, or either or both of these substances, mixed with pulverized cork or with dry sawdust, for purposes of economy, may be used in packing grapes and other fruit, and will prevent their decay. Peaches, if first wrapped in paper, may also be prevented from decaying by packing them in sulphur; or in sulphur and charcoal, the paper keeping the powdered sulphur from becoming attached to the skin of the fruit. The sulphur may also be applied, though with less advantage, when mixed with any vegetable chaff, or any finely-divided dry vegetable material.

What I claim as my invention, and desire to secure by Letters Patent of the United States, is—

1. The method of preserving fruit by means of sulphur in its pure or uncombined form, substantially as described.

2. The method of preserving fruit by means of sulphur in a pulverulent form, substantially as described.

3. The method of preserving fruit by means of pulverized sulphur and pulverized charcoal, combined substantially as described.

4. The method of preserving fruit by means of pulverized sulphur and pulverized cork, or any finely-divided dry vegetable material, combined substantially as described.

5. A box, cask, or any other receptacle for fruit, coated on its inner surface with sulphur, or impregnated with the same, as and for the purpose set forth.

GEORGE JAQUES.

Witnesses:
WILLIAM A. HAYES, Jr.,
C. E. CRAM.